United States Patent [19]

Sturm et al.

[11] Patent Number: 5,260,800
[45] Date of Patent: Nov. 9, 1993

[54] APPARATUS AND METHOD FOR HIGH-SPEED VIDEO TAPE DUPLICATION FROM MASTER DISK

[75] Inventors: Albert G. Sturm, San Jose, Calif.; Kevin Stec, Medford, N.J.; David H. Rubenstein, Santa Anna, Calif.

[73] Assignee: Laserdub, Inc., Irvine, Calif.

[21] Appl. No.: 883,066

[22] Filed: May 8, 1992

Related U.S. Application Data

[63] Continuation of Ser. No. 413,566, Sep. 27, 1989, abandoned.

[51] Int. Cl.⁵ .............................................. H04N 9/80
[52] U.S. Cl. .................................. 358/310; 358/311; 358/327; 360/10.1; 360/32; 369/84
[58] Field of Search ............... 358/310, 311, 312, 314, 358/315, 320, 321, 322, 327–328, 330, 36; 369/84; 360/15, 32

[56] References Cited

U.S. PATENT DOCUMENTS

| 4,320,486 | 3/1982 | Cooley et al. | 369/84 |
| 4,775,897 | 10/1988 | Umemoto et al. | 360/14.1 |
| 4,811,325 | 3/1989 | Sharples, Jr. et al. | 360/15 |

FOREIGN PATENT DOCUMENTS 0306151  3/1989  European Pat. Off. ............. 369/84

Primary Examiner—Tommy Chin
Assistant Examiner—Khoi Truong
Attorney, Agent, or Firm—Antonio M. Fernandez

[57] ABSTRACT

A laser video disk master is operated at 2× speed for duplicating video information to be recorded in VHS format. Two last disk video players are modified to operate in synchronism in order to multiplex from one to the other in duplicating video programs of length equal to the two recorded disks. The 2× frequency NTSC format video output signal is then demodulated, drop out detection is performed, and the digitally-encoded stereo audio information is separated, error corrected, and converted by digital to analog (D/A) conversion to left and right channels of stereo analog information. The left and right channels of audio information are presented simultaneously to an FM modulator for presentation to rotating video heads and to a 2× Dolby processor for presentation to linear heads. The demodulated 2× video information is converted to digital information by an analog to digital (A/D) converter and then time-base corrected and drop out compensated. New sync and blanking signals in digital form are switched into the digitized video signal, and digital color-under chroma processing and digital luminance noise reduction processing are performed. The 2× composite time base corrected and color-under processed video signal is then D/A converted to analog form for 2× speed duplication of VHS cassette copies. With suitable buffering, the signal may be presented to a bank of VHS recorders.

4 Claims, 6 Drawing Sheets

APPARATUS AND METHOD FOR HIGH-SPEED VIDEO TAPE DUPLICATION FROM MASTER DISK

This application is a continuation of application Ser. No. 07/413,566, filed Sep. 27, 1989, now abandoned.

BACKGROUND OF THE INVENTION

1. Field of the Invention

The present invention relates to video technology and to video tape duplication. More particularly, this invention relates to a system for duplication of video programs from a laser disk master to a video cassette at a speed that is a multiple of the normal playback speed of the laser disk master.

2. The Prior Art

Systems for duplication of video programs from a magnetic tape master through a bank of slave recorders have been in commercial use for many years. More recently, a system for duplication from a master magnetic video tape at twice normal speed has been developed and used commercially by Rank Video Services of America.

The technology for storing analog and digital data on a disk using a laser beam, and using a laser beam as the transducer for playback has been developed and widely used for audio programs as well as video programs. A significant advantage of the laser disk technology over magnetic tape is high quality without degradation from repeated playback, due to the fact that the media need not be in physical contact with the means for reading it. Consequently, a laser disk is preferable to magnetic tape for use as a master to store a video program to be duplicated on magnetic tape, such as on half-inch tape in conventional VHS format video cassettes.

Despite the existence and use of prior art duplication systems, a system for duplication from an optical laser disk would be advantageous and duplication from a laser disk at increased speed and, hence, reduced duplicating time, would be very advantageous because increasing the throughput of the duplicating system reduces the duplication cost drastically. However, increased duplicating speed must not be obtained at the expense of playback quality.

Laser disk players have been specifically designed for playback of video programs in the NTSC format, are commercially available, and have at least twice the bandwidth of a VHS video cassette. An example is the laser disk player model LD-V6000 manufactured by Pioneer Electronic Corporation. Unlike audio laser disk players, these video laser disk players read FM modulated analog video signals in NTSC format from the laser disk and process the signals in analog form for all purposes.

It would be advantageous to provide all-digital processing of 2× FM demodulated NTSC format video signals read from a laser disk, such as chroma color-under, noise reduction, dropout compensation and time base correction processing, in order to take advantage of the precision and accuracy inherent in digital processing. However, no system for performing these functions is known on the prior art.

A particular problem in multi-speed duplication of a time-base-corrected composite video signal is the "color under" processing necessary for recording in the VHS format the video signal being read from a laser disk, which contains the original color signal obtained from the color camera, including a color subcarrier burst and color encoded in the luminance signal. The term "color-under" processing means converting the 3.58 MHz color subcarrier frequency to a frequency lower than, hence "under", the luminance frequency of 2.5 MHz.

Color-under processing was designed into the VHS format of video recording to accommodate long, intermediate and short recording times on a normal length of video cassette tape which is implemented by switching the VCR between slow, intermediate and fast tape speeds. When recording at a slow tape speed, the VCR has a limited bandwidth. At slow speeds, the VCR cannot record very high frequencies because the tape speed past the helical scan recording head directly limits the highest frequencies that can be recorded to a value below that which is normally necessary to provide the color information. In order to accommodate the recording time of a two hour motion picture on a small cassette, a design decision was made to sacrifice the minimum bandwidth of 4.5 MHz necessary for the video color signal in the VHS format. Since the chroma subcarrier at 3.58 MHz cannot be sacrificed if color is to be decoded, VHS format video recording separates the chrominance portion of the signal and converts it to a lower frequency, i.e., heterodynes the color signal down to 629 KHz, then mixes it with FM modulated luminance for recording on the tape.

As a consequence, only half of the bandwidth of the original video signal is required to be recorded. On playback, the color-under signal is detected and heterodyned back up to 3.58 MHz and mixed with the luminance being read from the tape before presenting it to the television receiver or monitor for color decoding. The result is a presentable picture on a home receiver which satisfactorily reproduces the color information of the original signal.

For twice-speed duplication of two-hour video motion picture programs on a cassette tape intended to be played back at low speed, the color-under signal at 629 KHz becomes 1.18 MHz, and everything else is increased by a factor of two in the high-speed duplication system.

In addition, conventional compensation for video information drop outs due to playback media imperfections in VHS playback consists of continually storing one line of video information as it is read from the record medium and detecting when the playback video signal is missing for short periods. When that occurs, circuitry is activated to substitute the luminance signal of the stored line for the current defective line being read from the record medium.

OBJECTS OF THE INVENTION

An object of the present invention is to provide an apparatus and method for duplicating video programs which utilizes a conventional optical laser disk recorded in NTSC format as the master for programs to be duplicated at twice the normal speed in the VHS format for video cassettes.

A further objective of the invention is to provide digital color-under chroma, and luminance signal processing in achieving multi-speed video cassette duplication for more efficient production of video cassette recorded programs from a laser disk master.

Still another objective is to provide improved laser disk playback by luminance noise reduction from the laser disk playback prior to recording on video cassettes.

BRIEF DESCRIPTION OF THE INVENTION

According to a first aspect of the present invention, an apparatus and method are provided for utilizing a laser video disk master operating at twice speed for duplicating video information to be recorded in VHS format.

In a presently-preferred embodiment, two laser disk video players are modified by dividing the servo reference signals by two in order to double the speed of the laser disk, and by further including an additional advance horizontal sync pulse to assure operation properly synchronized with the time-base-corrected video signal generated by the apparatus of the present invention.

The 2× frequency NTSC format video output signal from the disk players is presented to a two-to-one multiplexer which selects one of the signals for processing. The 2× video signal is then demodulated, drop out detection is performed, and the digitally-encoded stereo audio information is separated, error corrected, and converted by digital to analog (D/A) conversion to left and right channels of stereo analog information. The left and right channels of audio information are presented simultaneously to an FM modulator for presentation to rotating video heads and to a 2× dolby processor for presentation to linear heads.

The demodulated 2× video information is converted to digital information by an analog to digital (A/D) converter. The 2× digital video information is then time-base corrected and drop out compensated. New sync and blanking signals in digital form are switched into or mixed with the digitized video signal and digital color-under chroma processing and digital luminance noise reduction processing are performed.

The 2× composite time base corrected and color-under processed video signal is then D/A converted to analog form. The signal is ready to use to prepare duplicate VHS cassette copies of the original. With suitable buffering, the signal may be presented to a bank of VHS recorders, the RF portions of which have been by-passed. In this manner, all copies contain the same color information, since it is derived from the master signal and not generated in the individual slave machines.

According to another aspect of the present invention, color-under dropout compensation and noise reduction processing are performed digitally.

BRIEF DESCRIPTION OF THE DRAWINGS

FIG. 3b is a timing diagram of the outputs of various components of the circuit of FIG. 3a.

DETAILED DESCRIPTION OF A PREFERRED EMBODIMENT

Figure 1:
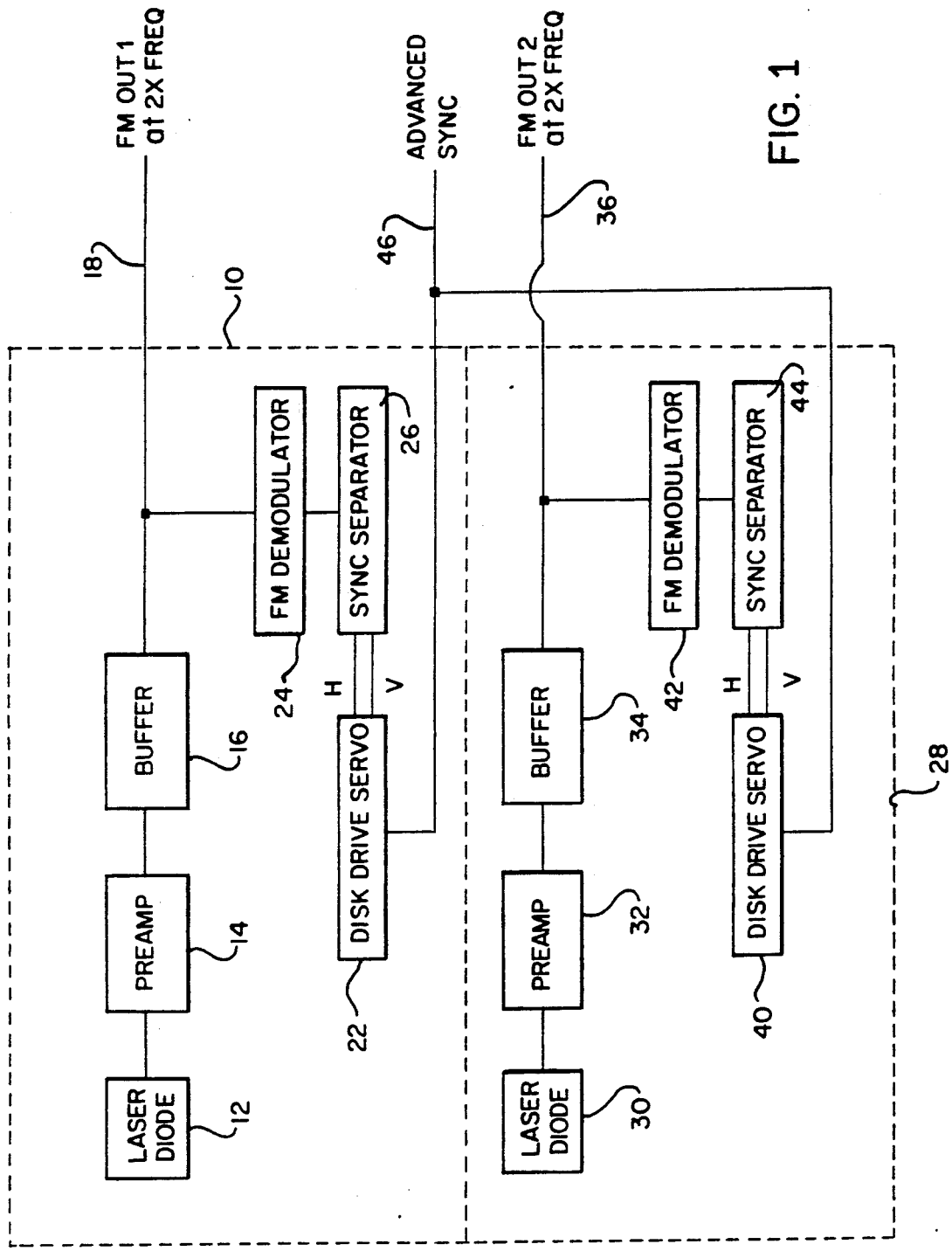
FIG. 1 is a block diagram of two laser disk video players modified for use with the present invention.

Referring first to FIG. 1, first video disk player 10 is shown to include laser diode 12 for picking up information from a laser video disk (not shown). Preamplifier 14 amplifies the signal produced by laser diode 12. Buffer amplifier 16, having a unity gain bandwidth of at least 20 MHz, provides the drive capability necessary for driving the system of the present invention on an output line 18.

A one-half H period advanced horizontal sync signal from a time base corrector, as will be disclosed herein, has its normal output divided by two as well as the sync signals received by disk drive servo system 22 from FM demodulator 24 via sync separator 26 will cause the laser video disk to spin at twice its normal speed. FM demodulator 24 may be a SG 9181 limiter/FM demodulator integrated circuit, available from RCA Corporation. Sync separator 26 may be an LM 1881 sync separator integrated circuit, available from National Semiconductor Corporation of Santa Clara, Calif. The use and operation of servo systems is well understood by those of ordinary skill in the art and will not be unnecessarily discussed herein. The purpose of the advanced horizontal sync signal, as will be more fully disclosed herein, is to assure that the video signals from the video disk players maintain a synchronized relationship with signals produced by the system of the present invention. The output of buffer amplifier 16 will be the standard NTSC composite FM modulated video signal from the video disk at double its normal frequency.

Those of ordinary skill in the art will recognize that the internal filter circuits within the disk player must be scaled to take into account the doubled speed of the signal and its accompanying frequency shifts. In addition, the power supply voltage to the DC motor drive must be increased from 15 to 30 volts in order to accommodate the increased speed. Also, depending on the particular disk drive used, appropriate modifications for reading time code information from the vertical blanking portions of the video signals must be performed. In addition, all requirements of any on-board microprocessor control which are affected by the speed change must be satisfied. These requirements and modifications will vary among individual disk players, are well within the knowledge of the ordinary worker in the art, and will not be included herein to avoid overcomplicating the disclosure.

Second video disk player 28 may be identical to first video disk player 10, and is shown to include laser diode 30 for picking up information from a laser video disk (not shown). Preamplifier 32 amplifies the signal produced from the disk by use of laser diode 30. On line 36 buffer amplifier 34 provides the drive capability necessary for driving the system of the present invention. Preamplifier 32 and buffer amplifier 34 may be conventional video bandwidth amplifiers.

A one-half H period advanced horizontal sync signal from a time base corrector, as will be disclosed herein, has its normal output divided by two so that sync signals received by disk drive servo system 40 from FM demodulator 42 via sync separator 44 will cause the laser video disk to spin at twice its normal speed. The output of buffer amplifier 34, like the output of buffer amplifier 16, will be the standard NTSC composite video signal from the video disk at double its normal frequency.

Two or more video disk players may be used in conjunction with the system of the present invention to allow a full length movie to be automatically duplicated without the need to turn the disk over to its second side.

Figure 2:
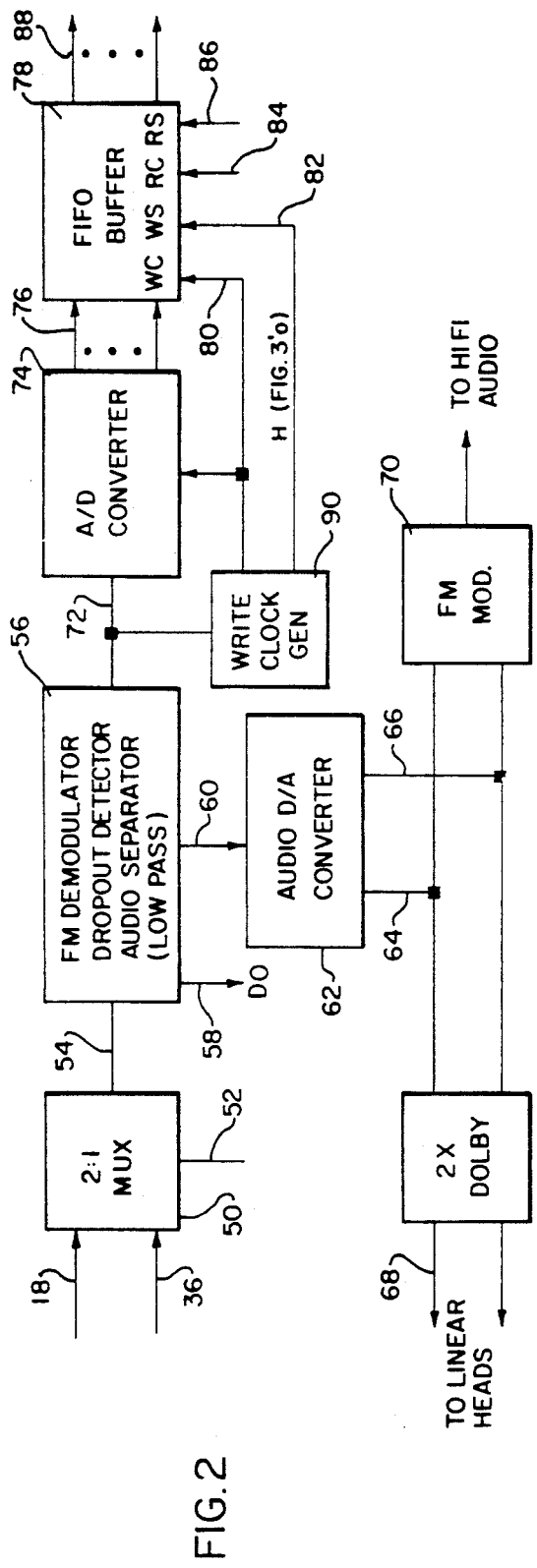
FIG. 2 is a block diagram of a portion of a video duplicator according to a presently preferred embodiment of the invention, showing the video demodulator, audio separator, drop out detector, time base correction, and analog to digital conversion portions of the system.

Referring now to FIG. 2, the output lines 18 and 36, respectively, containing composite analog video information from buffer amplifiers 16 and 34, are shown connected to 2:1 multiplexer 50. Multiplexer 50 may be configured from wide bandwidth analog switches, such as the model HI 201, available from Harris Semiconductor. Control input 52 of 2:1 multiplexer 50 may be driven by a computer which reads the timing information in the vertical blanking portions of the video signal from the master laser disk and causes the multiplexer 50 to switch to the second disk player when the internal time code indicates that the program from the first disk has been completed.

Those of ordinary skill in the art will recognize that more than two video disk players could be used, in which case the number of inputs provided for multiplexer 50 would be increased and the computer would sample the internal time codes of the subsequent disk players to determine when to switch to the next player.

Output line 54 of multiplexer 50 drives FM demodulator 56. FM demodulator 56 may use a pulse counter discriminator as is known in the art, designed to accommodate the increased bandwidth of the 2× signal. FM demodulator 56 contains a drop-out detector and low pass filter which is used to separate out the audio portion of the signal as is well known in the art. The low pass filter may have a cutoff frequency of 3.0 MHz to compensate for the doubled frequency, and should be 40 db down at 4.5 MHz. The drop-out detector may be a zero-crossing detector combined with circuitry for detecting missing zero crossings which characterize dropped out portions of the video signal. The drop out detector places a signal on DO output 58 when dropped-out portions of the signal are detected.

The demodulated audio signal (already in digital form from the laser disk) on line 60 is presented to audio D/A converter 62, which error corrects and converts the demodulated digital audio signal to 2× left and right channel audio signals on outputs 64 and 66, respectively as is well known in the CD art. Audio D/A converter 62 is clocked by a 33.76 Mhz clock source, which may be a crystal oscillator to which the recorded data is synchronized. The demodulated 2× left and right audio signals on lines 64 and 66 are fed to 2× Dolby processor 68, available by special order from Dolby Laboratories of San Francisco, Calif.

As is well understood by those of ordinary skill in the art, 2× Dolby processor 68 provides a noise reduced stereo audio signal which is sent to the linear recording heads of the VHS dubber recorders. The demodulated left and right 2× audio signals are FM modulated by FM modulator 70 to produce a modulated Hi-Fi audio output which may be sent to the audio set of the rotating heads of the VHS dubber recorders.

The demodulated composite analog video signal from FM demodulator 56, on line 72, is converted to a digital signal by A/D converter 74. In a presently preferred embodiment, A/D converter 74 may be a TDA 8703, available from Signetics Corporation of Santa Clara, Calif., and provides an eight-bit resolution output signal on output bus 76. The remainder of the video signal processing performed by the present invention is performed digitally.

As those of ordinary skill in the art will appreciate, the composite video signal out of FM demodulator 56 has a stability having a magnitude of approximately plus or minus 200 nanoseconds. This stability is insufficient for color video purposes and must thus be time-base corrected. Time-base correction is provided by circuitry which includes FIFO buffer 78. FIFO buffer 78 may be a micro PC 41101-2 integrated circuit available from NEC Corporation, but is generally a 910 stage, eight bit wide, serial shift register having separate read and write addressing capabilities.

Because of the speed of the required conversions, FIFO buffer 78 may be configured from two separate FIFO buffers, operating in an interleaved manner clocked at one half the data rate, i.e., 14.31818 Mhz, as is well known in the art. In a presently preferred embodiment, the digital data input is split into two portions prior to its presentation to the write portion of the interleaved FIFO buffers using four registers configured exactly like the registers having reference numerals 128, 130, 132, and 134 in FIG. 5a in the context of digital filtering, and clocked by both a 28.63636 MHZ clock and a 14.31818 MHz clock in the manner shown in FIG. 5a. On the read end of the interleaved FIFO buffers, the data is reassembled into a single data stream using a multiplexer as is also shown with respect to FIG. 5a.

The separate read and write paths to the FIFO buffer allow for time-base correction by allowing the data-out timing to be time stabilized and independent of the relatively unstable data-in timing. By advancing the disk player H sync reference by one half H period, the player output is allowed to vary anywhere within plus or minus one half of an H period. Since this timing nominally falls within the center of the read window, it allows correction for errors of up to plus or minus one half H from the player output. At the clock frequency at which FIFO buffer 78 is driven, the propagation time through 910 stages will be equal to one horizontal period.

FIFO buffer 78 has an eight bit data input fed by data bus 76, a write clock (WC) input 80, a write start (WS) input 82, a read clock (RC) input 84, a read start (RS) input 86, and an eight bit wide output 88.

Write clock input 80 is driven from the output of write clock generator 90. Write clock input 80 actually comprises two inputs for the interlaced FIFO buffers, one at 28.63636 MHZ and one at 14.31818 MHz. The clock circuits are shown with respect to FIG. 3a. Write clock generator 90 takes the output signal from FM demodulator 56 on line 72 and uses it to generate both the write clock pulses for write clock (WC) input 80 and the write start (WS) signal input 82 of FIFO buffer 78. The generation of the read clock (RC) and read start (RS) signals will be discussed with reference to FIG. 4.

Figure 3A:
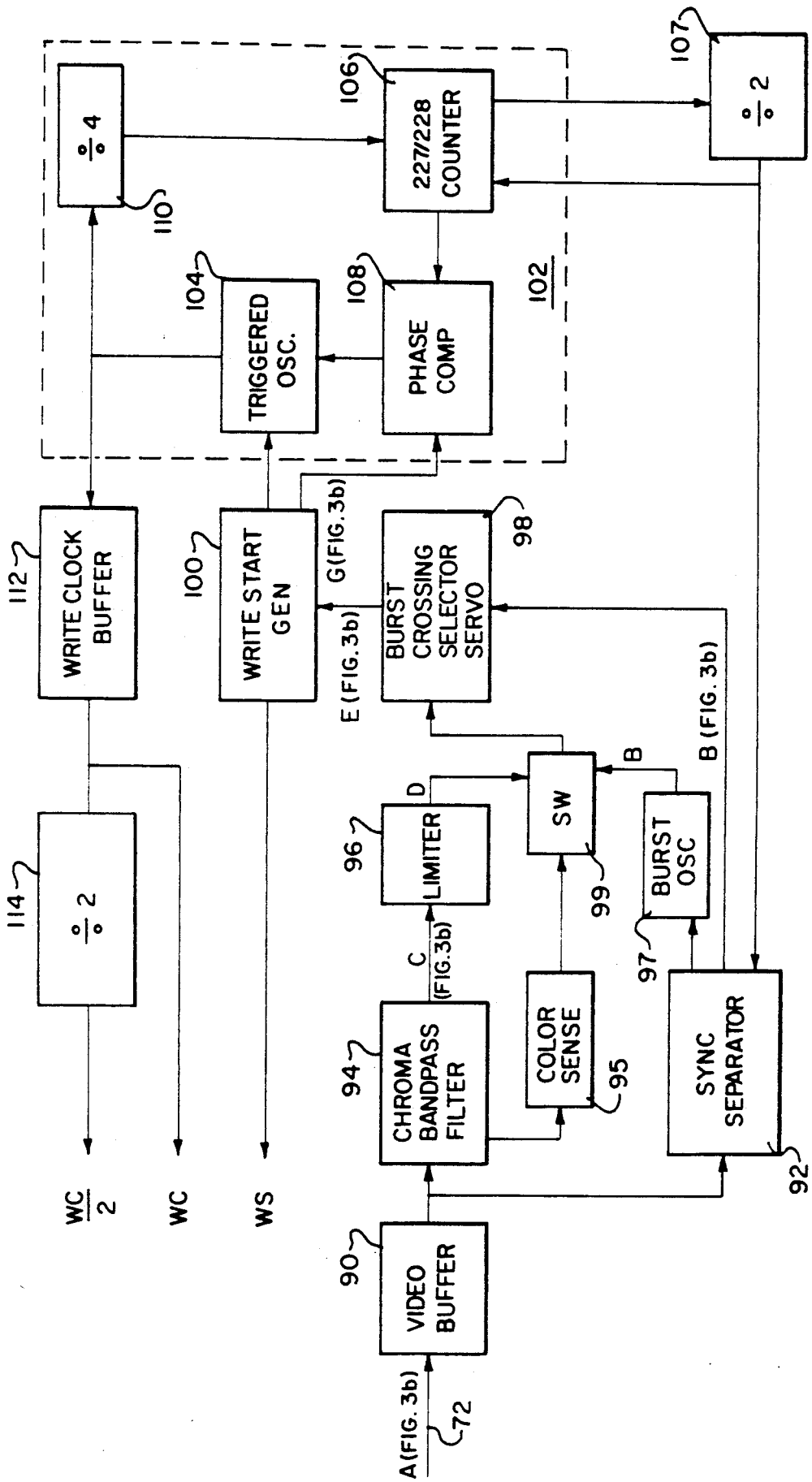
FIG. 3a is an expanded block diagram of the write clock generator shown in FIG. 2.
Figure 3B:
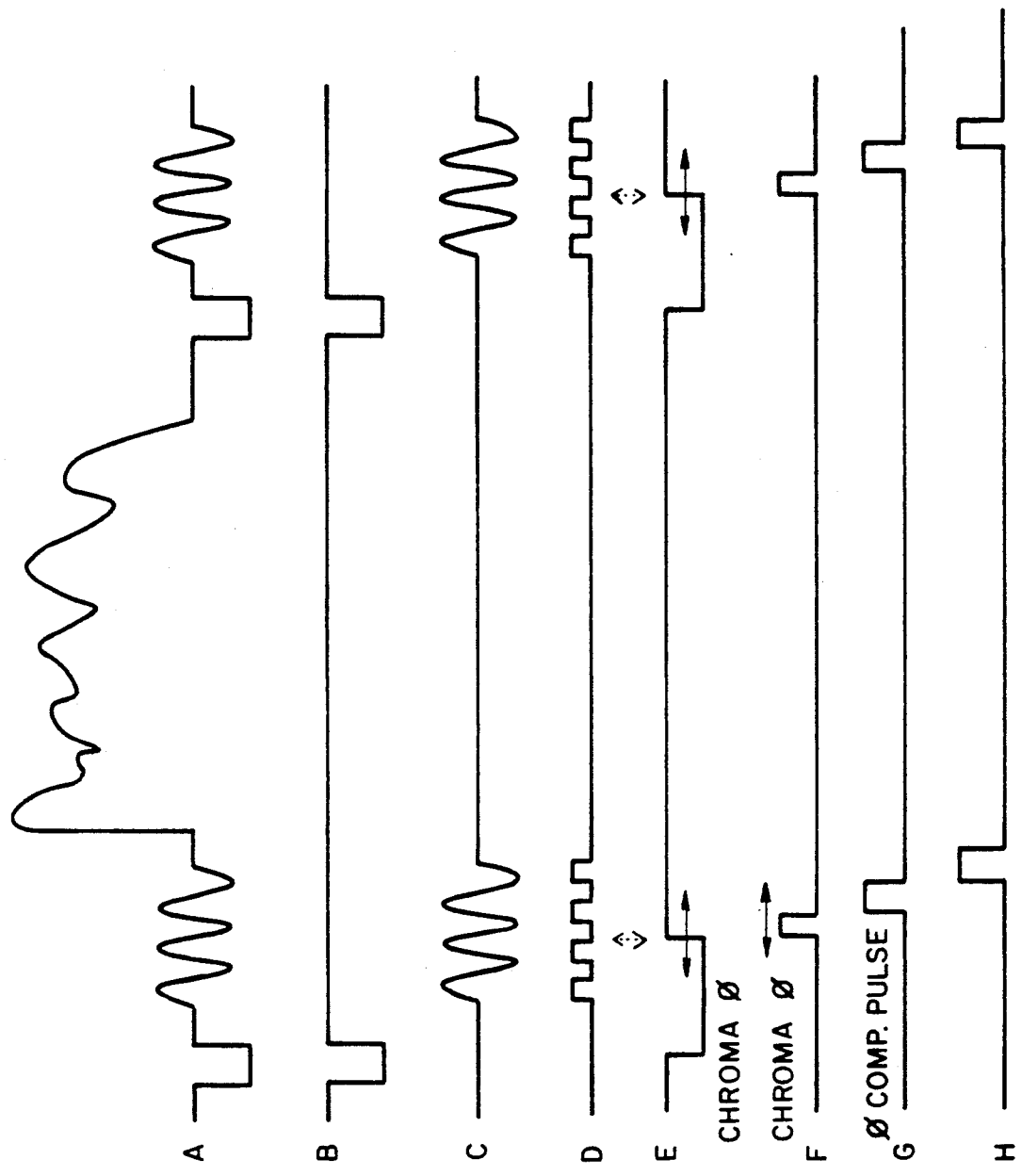

Referring now to FIGS. 3a and 3b, an expanded block diagram of the write clock generator and graphs of voltage versus time at various points of the block diagram, respectively, the generation of the write clock and write start pulses will be disclosed. Video buffer 90 has its input connected to line 72, the output line of FM demodulator 56. The voltage waveform present at the input of video buffer 90 is shown as trace "A" of FIG. 3b.

The output of video buffer 90 is connected to the input of sync separator 92. Sync separator 92 may be an LM 1881 sync separator integrated circuit, available from National Semiconductor Corp. of Sunnyvale, Calif. Its function is to isolate the sync pulses from the composite video signal. The voltage waveform at the output of sync separator 92 is shown as trace "B" in FIG. 3b.

The output of video buffer 90 is also connected to the input of input of chroma bandpass filter 94. Chroma bandpass filter 94 may be configured from conventional discrete circuitry using well known filter circuits, and has a center frequency of 7.16 MHz and should be down 40 db at plus and minus 1 MHz. The voltage waveform at the output of chroma bandpass filter is shown as trace "C" in FIG. 3b.

The output of chroma bandpass filter 94 is connected to the input of limiter 96, which may be a schmidt trigger or equivalent. The purpose of limiter 96 is to square up the chroma waveform as shown by the voltage output waveform of trace "D" in FIG. 3b.

Optionally, in addition to the output of chroma bandpass filter 94 which is connected to limiter 96, chroma bandpass filter 94 may be connected to a color sense circuit 95, which may include an integrator to sense the presence of the 7.16 MHz 2× color burst and a comparator. If the burst is present above a preset threshold, i.e., not more than 6 db down from its normal level, color sense circuit 95 assumes that color video information is present. If no chroma is present, the input of burst crossing selector servo is connected to the output of a H triggered burst oscillator 97. This oscillator may be readily configured from standard components, and produces a substitute color burst signal an appropriate delay time after the leading edge of the H sync signal out of sync separator 92. If chroma is present the input of burst crossing selector servo 98 is connected to the output of limiter 96. Switch 99 provides this function. Switch 99 may be configured from a plurality of logic gates to form a switch. The output of limiter 96 is connected to the input of burst crossing selector servo 98, which has its other input connected to the output of sync separator 92. Burst crossing selector servo 98 may be configured from conventional integrated circuits, and its purpose, as is well known in the art, is to delay the position of the leading edge of the H sync pulse to select the positive transition of the fourth cycle of the subcarrier burst. The output voltage waveform of burst crossing selector servo 98 is shown as trace "E" in FIG. 3b.

The output of burst crossing selector servo 98 is connected to the input of write start generator 100. Write start generator 100 may be configured from a variable delay circuit such as a differentiating pulse delay generator followed by two cascaded monostable multivibrators, such as MC 10198 integrated circuits, available from Motorola Corporation of Phoenix, Ariz. The variable delay is adjusted so that the output chroma may be phased properly relative to the reinserted burst in the output processing section of the present invention, as shown in waveform "F" of FIG. 3b. The first multivibrator provides a 70 nanosecond delay, after the variable delay, triggered by the burst crossing selector servo output, as shown in waveform "G" of FIG. 3b. The second multivibrator provides the write start pulse, as shown in waveform "H" of FIG. 3b, and which appears on line 82 of FIG. 2, connected to the WS input of FIFO buffer 78. The trailing edge of this pulse resets the triggered oscillator.

A phase locked loop 102, consists of triggered oscillator 104, divide by 227/228 counter 106, phase comparator 108, and divide by four circuit 110. Phase locked loop circuit technology is well known in the art and phase locked loop 102 may be conventionally configured. Phase comparator 108 controls triggered oscillator 104 by comparing the phase of the H sync signal out of the first multivibrator of write start generator (waveform "G" of FIG. 3b) 100 with that of the signal having the same frequency at the output of divide by 227/228 counter 106, which has as its input the divided-by-four output of triggered oscillator 104.

The output of 227/228 counter 106 is divided by two in divide-by-two circuit 107, i.e., a flip-flop, to produce a line-alternate square wave. The line-alternate square wave is fed back into 227/228 counter 106 to cause it to count only to 227 on alternate lines. The reason for this is to allow the counter output to be coincident with the positive burst crossing shift due to the NTSC color interlace. The line-alternate square wave is also feds to sync separator 92 so that the H sync pulse out ma be delayed by about 70 nanoseconds for every other line in order to select the positive burst crossings.

The output of triggered oscillator 104 is connected to write clock buffer 112 which is connected to divide-by-two circuit 114. The output of write clock buffer 112 is also connected to the convert start input of A/D converter 78 of FIG. 2, and the output of divide by two circuit 114 is connected to the write clock inputs of interleaved FIFO buffer 78.

Figure 4:
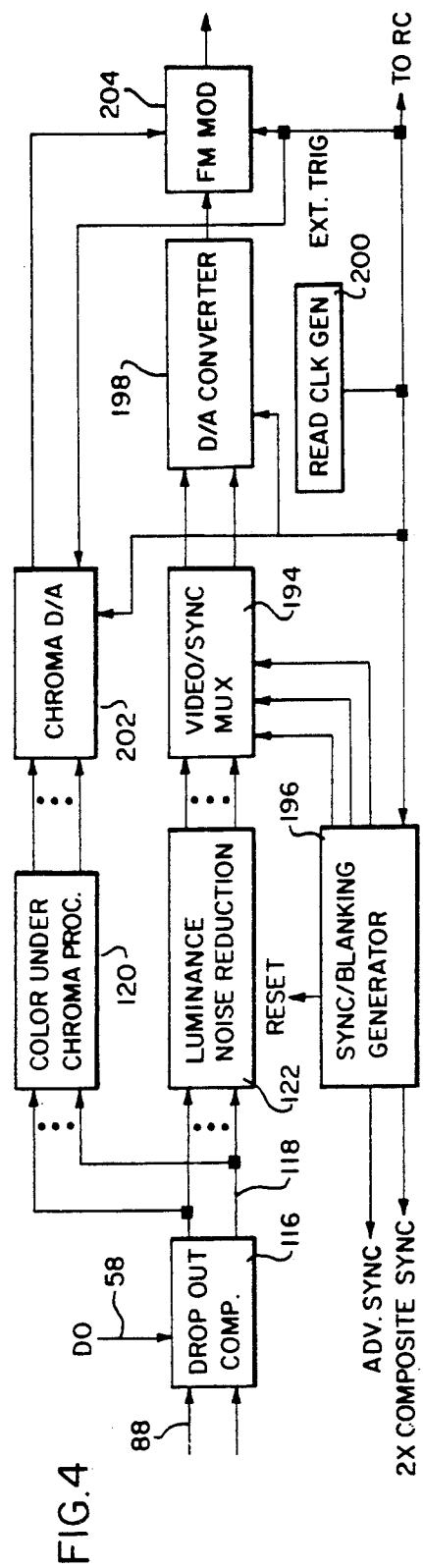
FIG. 4 is a block diagram of a portion of a video duplicator according to a presently preferred embodiment of the invention, showing the drop out compensator, sync and blanking burst generation, and chroma-/luminance processor portions of the system.

Referring now to FIG. 4, a block diagram of another portion of the system of the present invention, drop out compensator 116 is driven from the eight bit data bus 88 out of FIFO buffer 78 of FIG. 2. The drop out detected signal (DO line 58) from the dropout detector in block 56 of FIG. 2 is presented to drop out compensator circuit 116. Drop out compensator 116 may include two 454 stage eight bit wide buffers interleaved to comprise 912 stages because of the data speed in a manner well known in the art.

The function of drop out compensator circuit 116 is to replace portions of any horizontal video lines which have "dropped out" because of read errors from the laser disk media. The replacement data would be obtained from neighboring horizontal line data which has been stored, and would be placed into the data stream of a given horizontal line if drop out has been detected. If no drop out has been detected, drop out compensator 116 passes the signal on bus 88 through it; if a drop out has been detected, drop out compensator 116 would replace the dropped out byte with the corresponding byte from the neighboring horizontal lines. However, those of ordinary skill in the art will realize that, since the data is composite video data, chroma information having a particular phase depending on the frame and line exists on the signal. The chroma information on the line previous to the line having the dropped out portion does not have the same phase as the line having the dropped-out portion and therefore cannot be used to compensate. In a presently-preferred embodiment, the solution to this problem is to sample two samples on either side of the dropped out sample in the same line and average them together to use for the compensated signal. This will work because these two samples will have the proper phase; the samples are averaged to approximate the data in the position between them.

This solution may be implemented by use of a delay-by four-circuit configured from, for example, an AM 92520 pipeline register available from Advanced Micro Devices of Santa Clara, Calif. When the dropped-out horizontal sample is in the center position of the delay-by-four circuit, the horizontal sample two samples prior to the horizontal sample having the dropped-out portion is at the input to the delay-by-four circuit and the horizontal sample two samples after the horizontal sample having the dropped-out portion is at the output of the delay-by-four circuit. The input and the output of the delay-by-four circuit are merely added together and divided by two to give an average signal having the proper phase. Standard digital adder and divider circuits may be employed for this purpose.

The eight bit output of dropout compensator 116 on bus 118 is presented to the input of color-under chroma processor 120 and luminance noise reduction unit 122. The operation of color-under chroma processor 120 and luminance noise reduction unit 122 may best be seen with reference to FIGS. 5a and 5b.

Figure 5A:
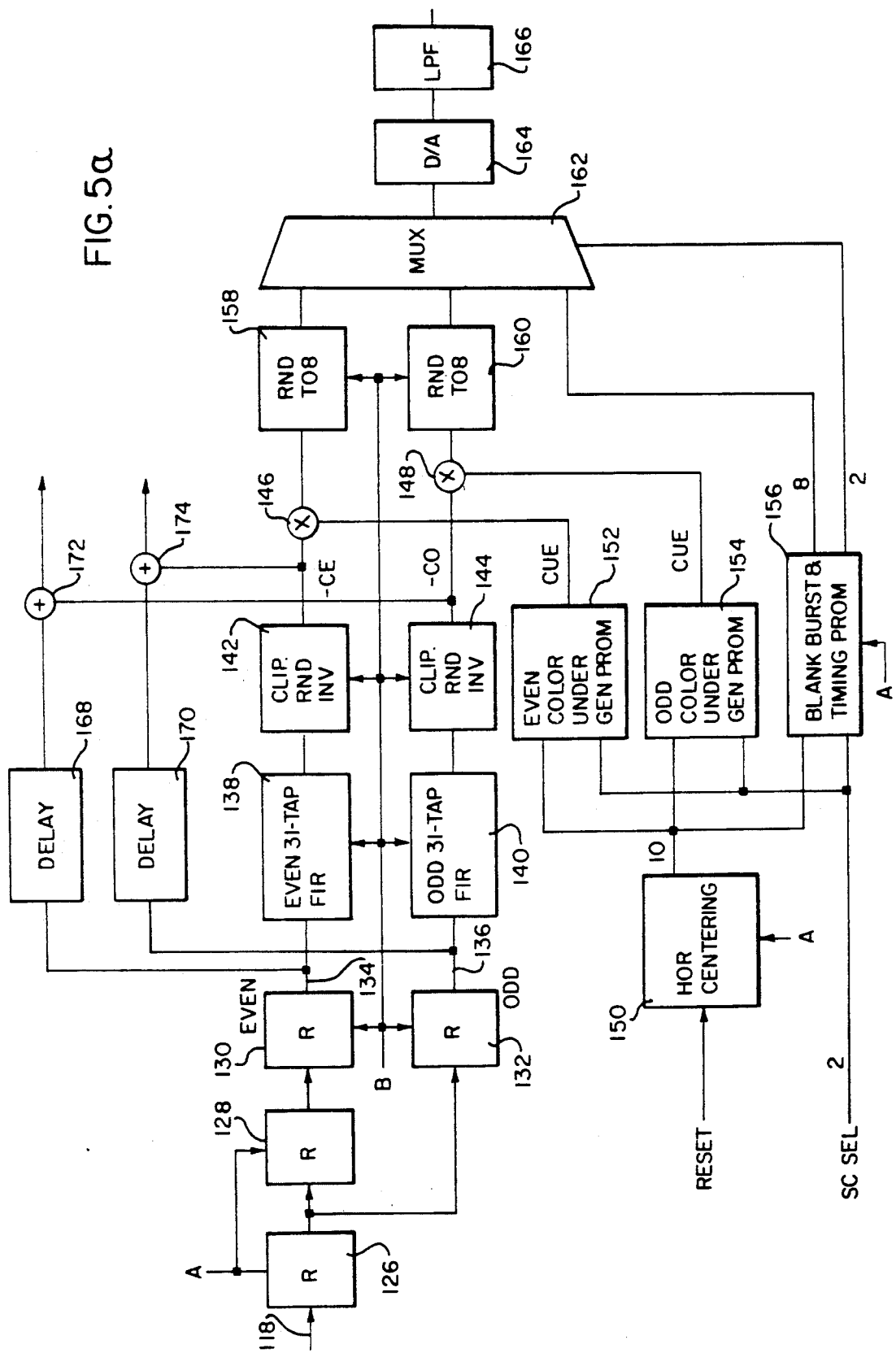
FIG. 5a is an expanded block diagram of the digital color-under processor portion of the block diagram of FIG. 4.

Referring now to FIG. 5a, the operation of a presently preferred embodiment of a digital color-under chroma processor 120 suitable for use with the present invention will be described. Clocked registers 126, 128, 130 and 132, which may be conventional TTL registers such as 74AS574 octal latches, available from Texas Instruments of Dallas, Tex., divide the video signal into an even path on bus 134 and an odd path on bus 136. Registers 126, 128 and 130 form a series chain. The output of register 130 is even bus 134. The output of register 126 is fed to the input of register 132. The output of register 132 drives the odd bus 136. Register 128 causes a one clock delay in the even path so that the even and odd data are synchronized in time. Registers 126 and 128 are driven by a common "A" clock having a frequency of 28.63636, whose source is a read clock generator 200 described with reference to FIG. 4. Registers 130 and 132 are driven by a common "B" clock having a frequency of 14.31818 whose source is the read clock generator divided by two.

The split odd and even high-speed composite data are fed to even 31-tap FIR filter 138 and odd 31-tap FIR filter 140 respectively. FIR filters 138 and 140 separate the chrominance portion of the digital video signal from the luminance portion of the signal. The chrominance portion of the signal is used for the generation of the digital color-under chroma signal. FIR Filters 138 and 140 may be constructed from integrated circuit FIR filters such as the ZR 33891 PJC digital signal processing chip available from Zoran Corporation of Santa Clara, Calif. or equivalent. FIR filters 138 and 140 are 31-tap band pass filters. Since the FIR filters has a structure wherein every other co-efficient is zero, they may be split into even and odd paths so that all of the multipliers which comprise the filters will be effectively used. There are thus 16 multipliers in each even and odd filter design which gives an equivalent 31-tap filter. The structure and operation of FIR filters is well-known in the digital signal processing art.

The even and odd outputs of the FIR filters 138 and 140 are then clipped, rounded and inverted in clip, rounding and invert circuits 142 and 144 respectively. The clipping process limits the upper level of the signal to levels which are within the range of the 8 bits which are used on the bus. The filters convert the 8-bit range of zero to 255 to a range of from plus 127 to minus 127. The actual output range of the filter is much larger than the 8-bit range but is truncated down by rounding. Well known one-half bit rounding techniques are used. The signals are inverted to enable later subtraction of this output from the delayed original signal in an adder circuit in order to subtract the chroma, as will be disclosed later herein. Clip, rounding and invert circuits 142 and 144 may be implemented by ROM look-up tables, as is well-known in the art. Even 31-tap FIR filter 138, odd 31-tap FIR filter 140 and clip, rounding and invert circuits 142 and 144 are driven by the same 14.31818 MHz clock which drives registers 130, 132 and the FIR filters 138 and 140, since they all form a series shift register chain.

The outputs of clip, rounding and invert circuits 142 and 144 are minus even chroma samples $-C_E$ and minus odd chroma samples $-C_O$ respectively. These signals are mixed with color-under signals in multipliers 146 and 148 respectively. Multipliers 146 and 148 may be conventional multiplier circuits, such as LMU-08 integrated circuits, available from Logic Devices of Milpitas, Calif.

Color-under chroma processor 120 also includes horizontal counter 150 which provides 10-bit addresses corresponding to successive portions of the horizontal video period for even color-under generator ROM 152, odd color-under generator ROM 154 and blanking, burst and timing ROM 156. The color-under generator ROMs 152 and 154 and blanking, burst and timing ROM 156 may be configured as look-up table generating ROMS, as is well known in the art. Even color-under generator ROM 152 and odd color-under generator ROM 154 generate even and odd portions, respectively, of a digital color-under sinewave signal. The look-up table contains four selectable digital sinewave signals having relative phases of 0°, 90°, 180°, and 270° in accordance with the VHS color-under format. An outboard decoder generates two selection signals which select one of these four phases for each horizontal line. As those of ordinary skill in the art will appreciate, the reason for this selection is that, in the color-under VHS standard format, one of four phases is used depending on the identity of the frame and the identity of the line in that frame. Horizontal counter 150 is driven by the same clock which drives registers 126 and 128.

Blanking, burst and timing ROM 156 is a look-up table containing the blanking, burst, and timing signal portions of a horizontal line. It is driven from horizontal counter 150.

The outputs of even and odd color-under generator ROMS 152 and 154 are in inverted form so that, when they are multiplied by the inverted even and odd chroma signals in multipliers 146 and 148, a non-inverted result is obtained. In a presently-preferred embodiment, the output of multipliers 146 and 148 are rounded to 8-bits to be compatible with the D/A converters by rounding circuits 158 and 160 which may also be ROM look-up tables.

The outputs of rounding circuits 158 and 160, as well as the blanking and burst information from blanking, burst and timing generator ROM 156, are multiplexed together in multiplexer 162. The select input of multiplexer 162 are driven by signals from blanking, burst and timing generator ROM 156. The output of multiplexer 162 contains the composite digital video signal including blanking and burst information.

The 8-bit digital output from multiplexer 162 is then converted to an analog signal by D/A converter 164, clocked by the read clock generator. In a presently-preferred embodiment, D/A converter 164 may be a BT-106, available from Brooktree, Inc., of San Diego, Calif. A low pass filter 166 is used to filter out the upper hetrodyne information and other high frequency noise generated by the D/A conversion process. Low pass filter 166 should be flat to 5 Mhz and ideally 40 db down at 7.16 Mhz.

Also shown in FIG. 5a are even and odd delay circuits 168 and 170. Delay circuits 168 and 170 may be configured from NEC micro Pc 41101 integrated circuits, and are designed to produce a delay exactly equal to the total delay produced by FIR filters 138 and 140 and clip, rounding, and invert circuits 142 and 144. The delay is necessary so that corresponding bytes are presented to the inputs of even and odd adder circuits 172 and 174. Even and odd adder circuits 172 and 174 add the bytes out of delay circuits 168 and 170, respectively, to the bytes out of clip, rounding, and invert circuits 142 and 144. This addition effectively acts as a low pass filter and subtracts the odd and even bandpass chroma information signals $-C_H$ and $-C_O$, respectively, from the delayed even and odd luminance plus chroma signals, leaving only the luminance portions at their outputs.

Figure 5B:
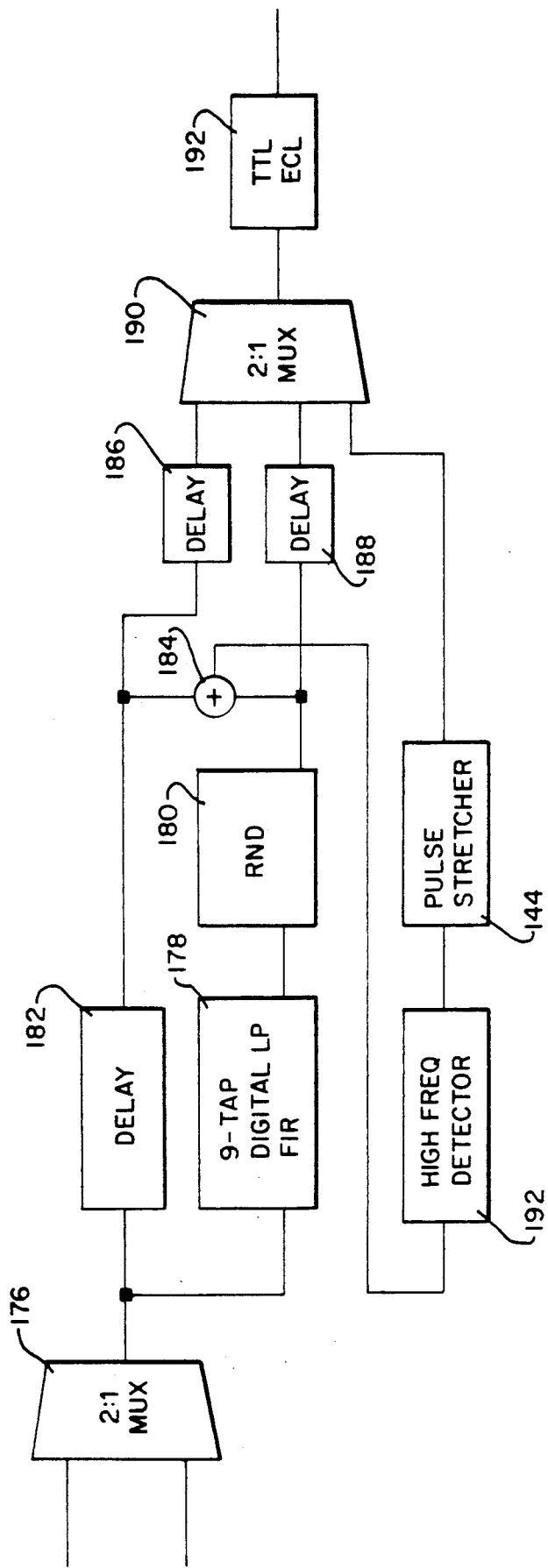
FIG. 5b is an expanded block diagram of the digital noise reduction portion of the block diagram of FIG. 4.

A presently-preferred embodiment of the luminance noise reduction circuitry in block 122 of FIG. 4 is shown in FIG. 5b. Luminance noise reduction is used to reduce the noise and narrow the bandwidth in order to cut out high frequency noise. In a presently preferred embodiment, noise reduction is switched in only if it is determined that there is no high frequency video information present in the video signal.

The luminance signals, minus the chroma portions, resulting at the outputs of even and odd adder circuits 172 and 174, are mixed back together in multiplexer 176, which may be a 74AS298 integrated circuit available from Texas Instruments Corp. The select input of multiplexer 176 may be driven from the blanking, burst and timing ROM 156.

The output of multiplexer 176 is connected to the input of a 9-tap narrow band digital low pass FIR filter 178 having a cutoff frequency of approximately 2.5 MHz. The purpose of FIR filter 178 is to cut off high frequency noise. FIR filter 178 may be a one dimensional filter across the line. Those of ordinary skill in the art will recognize that the common standard design techniques for designing such filters such as Kaiser window designs or the Parks-McCellen design.

The output of FIR filter 178 is connected to rounding circuit 180, which may be implemented by a look-up table. Rounding circuit 180 rounds the output of the filter down an 8-bit binary number. Delay path 182 parallels digital filter 178 and rounding circuit 180 and delays the signal through it an amount exactly equal to the delay of the parallel path through FIR filter 178 and rounding circuit 180. Delay path 182 may be configured from NEC micro PC 41101 integrated circuit.

The outputs of rounding circuit 180 and delay path 182 are connected to a high pass filter which may be implemented by subtracting the data output of filter 178 from the unfiltered data out of delay path 182. Such an implementation is shown as a conventional adder circuit at reference numeral 184, and will pass frequencies between 2.5 MHz, the cutoff frequency of the low pass filter 178, and the 5 Hz upper band limit of the signal.

The outputs of delay path 182 and rounding circuit 180 are further delayed by delay paths 186 and 188, each having a delay of approximately four clock cycles. The outputs of delay paths 186 and 188 are presented to the inputs of 2:1 multiplexer 190, which selects either the unfiltered delayed signal from delay circuit 182 or the filtered signal from filter 178 and rounding circuit 180. The select input of 2:1 multiplexer 190 is driven by high frequency detector 192 and pulse stretcher 194.

High frequency detector 192 may be an envelope detector for the high frequency detail content. It may be implemented as an eight-bit digital comparator from two 74AS85 integrated circuits, available from Texas Instruments. Its threshold may be set at a level chosen by operator discretion in order to maximize noise limiting.

Pulse stretcher 194 may be a multi-stage serial shift register driven by the read clock generator. For example, a 74AS194 four bit bidirectional serial shift register may be used, having its first stage data input connected to the output of high frequency detector 192. The output of its last stage is its output. available from Texas Instruments. By employing pulse stretcher 194, the timing of the switching of the filter in and out of the circuit by multiplexer 190 is matched to the delays 186 and 188 in the signal path.

Together, high frequency detector 192 and pulse stretcher 194 detect high frequency information. Anything above the triggering level of the comparator is considered to be usable high frequency information. If high frequency detector 186 detects high frequency in the range of from 2.5 MHz to 5 MHz, it is assumed that there are useable high frequency components in the video signal.

The output of pulse stretcher 194 is connected to the select input of 2:1 multiplexer 190 such that 2:1 multiplexer 190 normally passes the output of filter 178 through rounding circuit 180 unless high frequency detector 192 and pulse stretcher 194 have detected useable high frequency signal energy, in which case the filter is disconnected four clock pulses after the high frequency has been detected. Those of ordinary skill in the art will recognize that, by altering the shift register length of pulse stretcher 194, a greater or lesser number of clock pulses will constitute the delay.

Since the digital video signals to multiplexer 190 are delayed by delay paths 186 and 188, signals supplied to high frequency detector 192 are not delayed, output from high frequency detector 192 and pulse stretcher 194 indicating high frequency signal information may be used to switch 2:1 multiplexer 190 a predetermined amount of time prior to the appearance of the digital video signal to the two inputs of multiplexer 190.

Returning now to FIG. 4, the 8-bit digital video signal enters video/sync multiplexer 194. Video/sync multiplexer 194 may be configured from a 74AS298 integrated circuit, available from Texas Instruments Co. The function of video/sync multiplexer 194 is to mix the video, sync, and blanking signals.

The select input to video/sync multiplexer 194 is driven by the sync and blanking generator 196. Sync and blanking generator 196 may be configured from a ROM look up table. Its function is to add the composite sync and blanking waveforms to the digital video data. One set of data inputs to video, sync multiplexer 194 comes from the output of luminance noise reduction circuit 122 and the other set of data inputs comes from the data outputs of sync and blanking generator 196. In addition, a digital composite 2× sync and a one-half H period advanced composite sync signal are generated from sync and blanking generator 196. These signals are used to synchronize the disk players and an external monitor.

The output of video/sync multiplexer 194 is converted to analog form in D/A converter 19. In a presently preferred embodiment, D/A converter 198 may be a BT-106 available from Brooktree. D/A converter 198 is clocked by a signal from read clock generator 200. Read clock generator 200 may be a 28.63636 MHz crystal controlled oscillator which may be free running or may be capable of external triggering for the purpose of synchronizing the operation of the system to an external source, such as a master sync generator or other recording systems.

The output of color-under chroma processor 120 is converted to analog form in D/A converter 202. In a presently preferred embodiment, D/A converter 202 may be a BT-106 available from Brooktree. D/A converter 202 is clocked by the read clock generator 200.

The analog signals from D/A converters 198 and 202 are presented to FM modulator 204. In a presently preferred embodiment, FM modulator 204 may be any conventional FM modulator capable of operating within the timing and bandwidth requirements disclosed herein. The output of FM modulator 204 is a 2× frequency VHS signal which may be used to drive any number of slave recorders.

While a presently-preferred embodiment of the invention has been disclosed, those of ordinary skill in the art will, from an examination of the within disclosure and drawings be able to configure other embodiments of the invention. These other embodiments are intended to fall within the scope of the present invention which is to be limited only by the scope of the appended claims.

What is claimed is:

1. Apparatus for duplicating at a multiple of the normal playback speed an FM modulated video program stored on a video CD, including:
   means for playing back said FM modulated video program from said video CD at a multiple of its normal playback speed to produce a multiple-of-speed FM modulated video program analog signal,
   means for demodulating said FM modulated video program to produce a demodulated multiple-of-speed video program analog signal,
   drop-out detection means for detecting dropped-out portions of horizontal lines of said demodulated multiple-of-speed video program analog signal,
   analog to digital conversion means for converting said demodulated multiple-of-speed video program analog signal to a digital multiple-of-speed video program signal including a plurality of multi-bit, parallel, digital bytes,
   means for time-base correcting said digital multiple-of-speed video program signal to produce a time-base corrected, digital multiple-of-speed video program signal including a plurality of time-base corrected multi-bit, parallel, digital bytes,
   drop-out compensation means, responsive to said drop-out detection means, for substituting time-base corrected multi-bit, parallel digital bytes into said time-base corrected, digital multiple-of-speed video program signal in place of ones of said time-base corrected multi-bit, parallel, digital bytes corresponding to said dropped-out portions of horizontal lines of said demodulated multiple-of-speed video program analog signal,
   means for separating said time-base corrected, digital video program signal into a digital chrominance signal and a digital luminance signal,
   means for generating a digital VHS format color-under chroma signal from said digital chrominance signal,
   means for reducing high frequency noise in said digital luminance signal to produce a noise-reduced digital luminance signal,
   means for generating a digital sync and blanking signal including a plurality of multi-bit, parallel, digital bytes,
   means for mixing said digital sync and blanking signal with said noise-reduced digital luminance signal to produce a composite digital luminance, sync and blanking signal,
   means for converting said composite digital luminance, sync and blanking signal to a composite analog luminance, sync and blanking signal,
   means for converting said digital VHS format color-under chroma signal to an analog VHS format color-under chroma signal,
   FM modulating means, responsive to said composite analog luminance, sync and blanking signal and to said analog VHS format color-under chroma signal, for producing an analog VHS format FM modulated, multiple-of-speed video program signal.

2. Apparatus for duplicating, at twice the normal playback speed, an FM modulated video program stored on a video CD, including:
   means for playing back said FM modulated video program from said video CD at twice its normal playback speed to produce a twice-speed, FM modulated, video program analog signal,
   means for demodulating said twice-speed, FM modulated, video program to produce a demodulated, twice-speed, video program analog signal,
   drop-out detection means for detecting dropped-out portions of horizontal lines of said demodulated, twice-speed, video program analog signal,
   analog to digital conversion means for converting said demodulated, twice-speed, video program analog signal to a digital, twice-speed, video program signal including a plurality of multi-bit, parallel, digital bytes,
   means for time-base correcting said digital, twice-speed, video program signal to produce a time-base corrected, digital, twice-speed, video program signal including a plurality of time-base corrected, multi-bit, parallel, digital bytes,
   drop-out compensation means, responsive to said drop-out detection means, for substituting time-base corrected, multi-bit, parallel digital bytes into said time-base corrected, digital, twice-speed, video program signal in place of ones of said time-base corrected, multi-bit, parallel, digital bytes corresponding to said dropped-out portions of horizontal lines of said demodulated, twice-speed, video program analog signal,
   means for separating said time-base corrected, digital, twice-speed, video program signal into a digital, twice-speed chrominance signal and a digital, twice-speed luminance signal,
   means for generating a digital, twice-speed VHS format color-under chroma signal from said digital, twice-speed chrominance signal,
   means for reducing high frequency noise in said digital, twice-speed luminance signal to produce a noise-reduced digital, twice-speed luminance signal, means for generating a digital, twice-speed sync and blanking signal including a plurality of multi-bit, parallel, digital bytes, means for mixing said digital, twice-speed sync and blanking signal with said noise-reduced digital, twice-speed luminance signal to produce a composite digital, twice-speed luminance, sync and blanking signal, means for converting said composite digital, twice-speed luminance, sync and blanking signal to a composite analog, twice-speed luminance, sync and blanking signal, means for converting said digital, twice-speed VHS format color-under chroma signal to an analog, twice-speed VHS format color-under chroma signal, FM modulating means, responsive to said composite analog, twice-speed luminance, sync and blanking signal and to said analog, twice-speed VHS format color-under chroma signal, for producing an analog, twice-speed VHS format FM modulated video program signal.

3. Apparatus for duplicating at a multiple of the normal playback speed a video program stored on a recording medium including means for playing back said video program from said recording medium at a multiple of its normal playback speed to produce a multiple-of-speed video program analog signal, drop-out detection means for detecting dropped-out portions of horizontal lines of said multiple-of-speed video program analog signal, analog-to-digital conversion means for converting said demodulated multiple-of-speed video program analog signal to a digital multiple-of-speed video program including a plurality of multibit, parallel, digital bytes, means for time-base correcting said digital multiple-of-speed video program signal to produce a time-base corrected, digital multiple-of-speed video program signal including a plurality of time-base corrected multibit, parallel, digital bytes, drop-out compensation means, responsive to said drop-out detection means for substituting time-base corrected multibit, parallel, digital bytes into said time-base corrected, digital multiple-of-speed video program signal in place of ones of said time-base corrected multibit, parallel, digital bytes corresponding to said dropped-out portions of horizontal lines of said demodulated multiple-of-speed video program analog signal, means for separating said time-base corrected, digital video program signal into a digital chrominance signal and a digital luminance signal, means for generating a digital VHS format color-under chroma signal from said digital chrominance signal, means for reducing high-frequency noise in said digital luminance signal to produce a noise-reduced digital luminance signal, means for generating a digital sync and blanking signal including a plurality of multibit, parallel, digital bytes, means for mixing said digital sync and blanking signal with said noise-reduced digital luminance signal to produce a composite digital luminance, sync and blanking signal, means for converting said composite digital luminance, sync and blanking signal to a composite analog luminance, sync and blanking signal, means for converting said digital VHS format color-under chroma signal to an analog VHS format color-under chroma signal, means responsive to said composite analog luminance, sync and blanking signal and to said analog VHS format color-under chroma signal for producing an analog VHS format multiple-of-speed video program signal, and duplicating means for recording said analog VHS format multiple of speed video program signal on at least one recording medium.

4. Apparatus as defined in claim 3 wherein said multiple of normal playback speed is twice the normal playback speed of said video program stored on said recording medium, and wherein said means for playing back said video program from said recording medium produces a twice-speed video program analog signal, and said analog-to-digital conversion means converts said twice-speed video program signal including a plurality of multibit, parallel, digital bytes.

* * * * *